No. 641,234. Patented Jan. 9, 1900.
M. O. ROSS.
CORSET FASTENER.
(Application filed July 3, 1899.)
(No Model.)
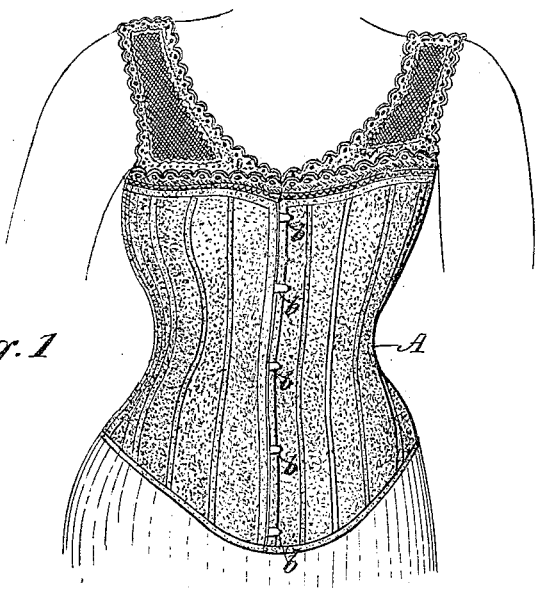
Fig. 1.
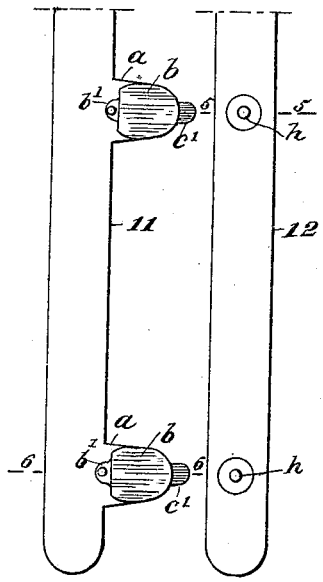
Fig. 2.  Fig. 3.
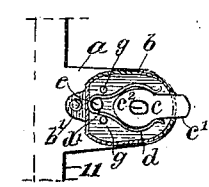
Fig. 4.
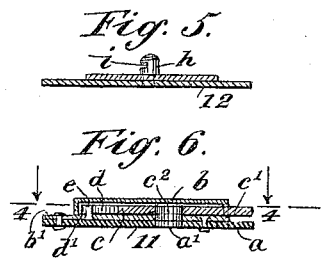
Fig. 5.
Fig. 6.
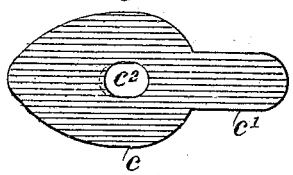
Fig. 7.
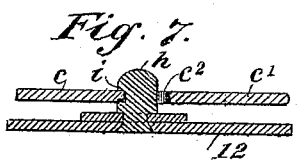
Fig. 8.
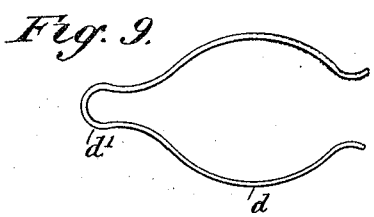
Fig. 9.
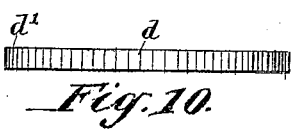
Fig. 10.
WITNESSES:
Wm P Patton
J M Hanaford
INVENTOR
Mary O. Ross
BY Munn
ATTORNEYS
THE NORRIS PETERS CO., PHOTO-LITHO., WASHINGTON, D. C.

UNITED STATES PATENT OFFICE.

MARY OLIVE ROSS, OF CARLINVILLE, ILLINOIS.

CORSET-FASTENER.

SPECIFICATION forming part of Letters Patent No. 641,234, dated January 9, 1900.

Application filed July 3, 1899. Serial No. 722,721. (No model.)

*To all whom it may concern:*

Be it known that I, MARY OLIVE ROSS, of Carlinville, in the county of Macoupin and State of Illinois, have invented a new and Improved Corset-Fastener, of which the following is a full, clear, and exact description.

This invention relates to means for detachably connecting together the front spring strips or busks of a corset, and has for its object to provide a simple and novel corset-fastener which is convenient in service, assures a secure connection of the corset-busks when the corset is loosely fitted upon the person, and a fastener which may be produced rapidly and cheaply by the ordinary methods of manufacture.

The invention consists in the novel construction and combination of parts, as is hereinafter described, and pointed out in the claims.

Reference is to be had to the accompanying drawings, forming a part of this specification, in which similar characters of reference indicate corresponding parts in all the figures.

Figure 1 is a front perspective view of a corset in service with the improvement thereon. Fig. 2 is an enlarged front view of a portion of a corset-busk and of a locking portion of the improvement in duplicate thereon. Fig. 3 is a like view of a mating busk and the other part of the fastener duplicated thereon. Fig. 4 is an enlarged partly-sectional plan view of the locking portion of the fastener, taken substantially on the line 4 4 in Fig. 6. Fig. 5 is a transverse sectional view essentially on the lines 5 5 in Fig. 3. Fig. 6 is an enlarged transverse sectional view substantially on the line 6 6 in Fig. 2. Fig. 7 is an enlarged transverse sectional view of details, showing the latching connection of the improved fastener. Fig. 8 is an enlarged plan view of a latch-plate which is a feature of the invention. Fig. 9 is an edge view of a peculiarly-shaped bow-spring employed, and Fig. 10 is a side view of the bow-spring shown in Fig. 9.

In the drawings, that show the invention and its application, A represents a corset of any preferred style, which is adapted to receive the improvement. The busks 11 and 12, portions of which are shown in Figs. 2 and 3, are extended and secured along the front edges of the corset A to elastically stiffen said edges and also afford means for attachment upon the busks and corset edges of the improved fasteners in sufficient number for efficient service. The busks 11 and 12 are respectively located at the right-hand and left-hand edges of the corset-front, and upon the busk 11, which is upon the right-hand edge in service, a series of spaced integral ears $a$ is formed, these ears providing base-plates whereon a plurality of latch-sections are affixed, and which are main portions of the improved fastener device. Each latch-section consists in part of a case $b$, formed of quite thin sheet metal essentially oval in form, these similar cases being each attached upon a respective ear $a$ by rivets or other means, and a small projection $b'$ may be extended from the rear edge on the bottom of each case to facilitate the fixture of the same upon the ear it is seated upon if rivets are employed as a means for attachment of the latch-sections upon the busk 11. It is to be understood, however, that the tabs $b'$ may be dispensed with and, if desired, the cases $b$ may be affixed by soldering or brazing them in place.

A latch-plate $c$ is an essential feature of the fastener and comprises a planchet the main portion of which is ovate in contour, having a flat lip or push piece $c'$ projected from one end of the ovate body, as shown in Figs. 4 and 8. At the transverse center and a proper distance from the ends of the latch-plate $c$ a slightly-elongated hole $c^2$ is formed therein. A slot is formed in the normally-outer end of the case $b$, through which the push-piece $c'$ of the latch-plate $c$ is passed outwardly, and when thus loosely located within the case $b$ the latch-plate seats upon the bottom of said case, as indicated in Figs. 4 and 6.

A bow-spring $d$, formed as shown in Figs. 4 and 9, is held in place within the case $b$, so as to clasp its limbs upon the convex side edges of the latch-plate $c$. The bow end $d'$ of the spring $d$ is preferably bent to fit partially around the keeper-stud $e$, that projects upward from the bottom of the case $b$ at the rear of the latch-plate $c$, which adapts the limbs of the spring to press upon the latch-plate at its opposite curved edges, as clearly shown in Fig. 4. Two guard-pins $g$ are upwardly projected from the bottom of the case $b$ at each side of the bow-spring $d$ near the stud $e$. The guard-pins $g$ bear upon the limbs of the bow-spring $d$ and serve to enforce contact of said limbs upon the edges of the latch-plate.

The normal position of the latch-plate $c$ within the case $b$ is defined by the bow-spring $d$, whereby the latch-plate is held to slide a limited distance endwise. A slightly-elongated aperture $a'$ is formed in the ear $a$ wherever a case $b$ is secured, which aperture normally registers with the hole $c^2$ in the latch-plate $c$.

A series of locking-studs $h$ project from the outer side of the busk 12 and are spaced apart so as to respectively enter the apertures $a'$ in the ears $a$ of the busk 11 when said ears are imposed upon the busk 12. A notch $i$ is formed in the side of each stud $h$ for reception of the edge of the hole $c^2$ in the latch-plate $c$, said portion of the margin defining the hole $c^2$ being that nearest to and opposite the stud $e$ when the latch-plate is in place. The height of all the studs $h$ is equal, and so proportioned that when inserted within the cases $b$ said studs will have clearance from the top plates of the cases. The upper ends of the studs $h$ are preferably convexed, so as to facilitate their introduction within the perforations $a'$ for engagement with the latch-plates $c$.

It will be apparent that upon insertion of the studs $h$, respectively, within the cases $b$ a latched engagement of the plates $c$ with said studs will be effected, and a release of each latch-plate $c$ from the stud $h$ it has locked engagement with by entering the notch $i$ of said stud can only be effected by pushing upon the projecting lip $c'$ of the latch-plate, which will spread the limbs of the bow-spring $d$. This will permit the latch-plate to slide rearwardly a sufficient degree to remove the lip on the edge of the perforation $c^2$ from the notch $i$ of the stud, and thus allow the stud to be slid down and out of the case $b$.

It is apparent that from the manner of construction the busks 11 12 do not lap, and thus improper thickening of the corset where its front edges meet is avoided.

The reliability, cheapness of construction, and neatness in design of the improved fastening device are meritorious features, and it will be evident that the fasteners will hold the front edges of a corset secured together if the lacing-strings of the corset are in a loosened condition, which is another obvious advantage pertaining to the improved corset-fastener.

Having thus described my invention, I claim as new and desire to secure by Letters Patent—

1. A corset-fastener comprising a case attachable upon a corset-busk over a hole therein, a latch-plate slidable in the case and having a projecting push-piece thereon, and a perforation in said latch-plate, a bow-spring held in the case and at its bow end embracing with its resilient limbs the opposite convex edges of the latch-plate, and a notched locking-stud on an opposing busk, which stud may enter the case, pass through the perforation in the latch-plate, and be locked therein by engagement of an edge of the latch-plate perforation within the notch of the stud.

2. The combination with a corset-busk having spaced ears thereon, and latching-sections each comprising a case secured upon an ear of the busk, a latch-plate the body of which is flat and ovate, and from which a push-piece projects through a slot in the case, said latch-plate having a perforation therethrough, a bow-spring held at its bow end by a stud that projects from the bottom of the case, and guard-pins erected in the case and contacting with the bow-spring to press its resilient limbs upon the convex edges of the latch-plate, of a plurality of locking-studs on an opposing busk and spaced to enter the perforations of the latch-plates, each stud having a cross-notch adapted to receive the edge of a latch-plate perforation through which said stud is inserted.

MARY OLIVE ROSS.

Witnesses:
WILLIAM S. P. ANDERSON,
WILLIAM H. ANDERSON.